United States Patent [19]

Schlosser

[11] Patent Number: 4,727,787
[45] Date of Patent: Mar. 1, 1988

[54] APPARATUS FOR MEASURING ELONGATE ARTICLES

[76] Inventor: Irvin L. Schlosser, P.O. Box 116, 2641 Township Line Rd., Hatfield, Pa. 19440

[21] Appl. No.: 14,586

[22] Filed: Feb. 13, 1987

[51] Int. Cl.$^4$ .......................... B26D 7/27; B26D 7/28; B65G 43/00; B65G 47/00
[52] U.S. Cl. ........................................ 83/522; 83/156; 83/208; 83/367; 83/369; 83/436; 198/502.2
[58] Field of Search ............... 198/502.2; 83/520, 522, 83/436, 367, 208, 369, 156

[56] References Cited
U.S. PATENT DOCUMENTS

| | | | |
|---|---|---|---|
| 2,619,134 | 11/1952 | West | 143/174 |
| 3,718,061 | 2/1973 | Wilkin | 83/201 |
| 3,811,196 | 5/1974 | Smith | 33/185 |
| 3,841,462 | 10/1974 | Schmidt | 198/39 |
| 3,917,078 | 11/1975 | Schmidt | 214/1 P |
| 3,923,157 | 12/1975 | Cavenar | 209/73 |

OTHER PUBLICATIONS

Brochure entitled "Promacut Measuring System for the Steel Industry", Production Machinery, Inc.

Primary Examiner—E. R. Kazenske
Assistant Examiner—Scott A. Smith
Attorney, Agent, or Firm—Howson and Howson

[57] ABSTRACT

Structural steel measuring apparatus comprises a reversible powered roller conveyor for advancing the structural member in opposite directions relative to a work station and a carriage movable alongside the conveyor and releasably clamped to the end of the structural member by an electromagnet. The carriage mounts a TV camera which reads an elongate scale extending alongside the conveyor. The reading is displayed on a monitor at the work station. The structural steel member can be positioned accurately with respect to the work station by driving the powered conveyor in either direction with the carriage magnetically coupled to its end. After the desired operation is performed, the carriage is decoupled from the structural steel member which is then advanced away from the work station by the conveyor.

7 Claims, 5 Drawing Figures

APPARATUS FOR MEASURING ELONGATE ARTICLES

FIELD OF THE INVENTION

The present invention relates to measuring and cutting devices, and more particularly, the present invention relates to apparatus for measuring elongate structural steel members for subsequent cutting to a predetermined length.

BACKGROUND OF THE INVENTION

In the steel fabrication industry, it is often necessary to cut structural steel members, such as I-beams, channels, and the like to an accurate predetermined length from an elongate piece of stock. One known commercially available system for performing this operation includes a powered roller conveyor adapted to receive the elongate stock and a remotely adjustable movable stop unit adapted to be positioned at selected adjusted locations alongside the conveyor. The stop unit includes an hydraulic assembly which releasably grips the track on which the unit rides and an abutment plate which can be moved into and out of engagement with the end of the elongate stock, as desired. The movable unit has its own drive which permits it to be positioned at various selected locations along the length of the conveyor as determined by the operator. A scale extends alongside the conveyor. A TV camera in the movable unit reads the scale, and a monitor displays the reading at the work station.

In use, the stop unit is driven to a predetermined location with respect to the conveyor and is clamped to its guide track at that location. The stop plate is moved into the path of movement of the end of the elongate stock, and the stock is advanced lengthwise on the conveyor. When the end of the stock reaches the abutment plate, it is properly positioned at a predetermined location with respect to the work station, thereby enabling an operation, such as a cutting operation, to be performed on the stock at the work station. After the operation is performed, the abutment plate is displaced out of the path of movement of the cut stock, and the cut member is advanced lengthwise away from the work station by the power conveyor. Such apparatus is disclosed in U.S. Pat. No. 3,841,462.

While the aforedescribed system may function satisfactorily for its intended purpose, it has certain limitations. For one thing, it is complex and expensive. For another, the operator must exercise care so as not to engage the abutment plate with too great a force and thereby dislodge the stop unit inadvertently. Moreover, because the movable unit includes its own clamping and driving mechanism, it is not as inexpensive to maintain and operate as desired.

There are several other patented systems for measuring and cutting elongate stock to length. Such systems are disclosed in the following U.S. Pat. Nos: 2,619,134; 3,718,061; 3,811,196; 3,917,078; and 3,923,157. While these patented systems may function satisfactorily for their intended purposes, there is not currently commercially available a simple, reliable, easy to install, use and maintain system for enabling structural steel members to be cut accurately to length.

OBJECTS OF THE INVENTION

With the foregoing in mind, a primary object of the present invention is to provide a novel system for measuring elongate workpieces and performing various operations thereon at a precise location.

Another object of the present invention is to provide an improved system for accurately measuring elongate structural steel members to enable them to be cut to a predetermined length.

A further object of the present invention is to provide a simple, rugged, and reliable device for accurately measuring elongate structural steel members.

As yet a further object, the present invention provides a relatively simple to use, easy to maintain, and inexpensive to manufacture and install, system for accurately measuring structural steel members for permitting them to be cut to length.

SUMMARY OF THE INVENTION

More specifically, the present invention provides apparatus for accurately measuring an elongate steel member so that an operation can be performed on the member at a work station located at a predetermined distance from one end of the member. The apparatus includes a power conveyor which is adapted to receive the elongate member and to permit it to be advanced lengthwise in opposite directions with respect to the work station and with respect to an elongate measuring scale which extends lengthwise of the conveyor. A carriage is mounted for movement parallel to the conveyor and alongside the scale. The scale is read by means mounted on the carriage, and the reading is displayed at the work station. The conveyor drive means is reversible to permit the steel member to be displaced selectively in opposite directions lengthwise relative to the work station. Releasable clamping means, preferably an electromagnet, is mounted on the carriage and is remotely operable from the work station enables the carriage to be coupled to the steel member at a predetermined location, preferably its end, so that the carriage moves in unison with the steel member on the power conveyor. An operator at the work station can accurately position the steel member with respect to the work stations by driving the power conveyor in one direction or the other until the scale reading on the work station monitor reaches the desired value. After the steel member has been operated upon at the work station, the releasable coupling means carried on the carriage is decoupled, and the steel member advanced lengthwise away from the work station by the power conveyor.

BRIEF DESCRIPTION OF THE DRAWINGS

The foregoing and other objects, features and advantages of the present invention should become apparent from the following description when taken in conjunction with the accompanying drawings, in which.

DESCRIPTION OF THE PREFERRED EMBODIMENT

Figure 1:
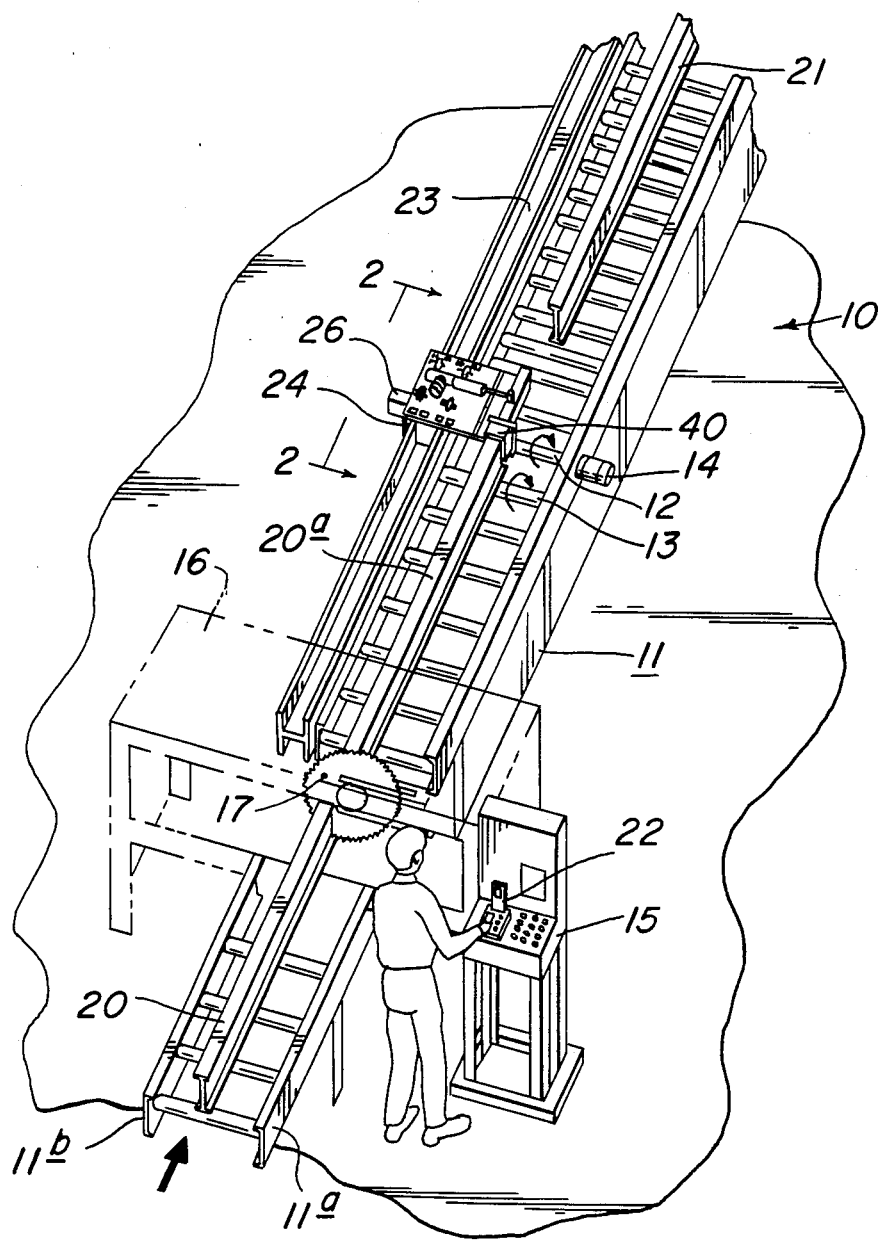
FIG. 1 is a perspective view of elongate article measuring and cutting apparatus embodying the present invention.

Referring now to the drawings, FIG. 1 illustrates apparatus 10 for measuring and cutting an elongate article. The apparatus 10 includes an elongate roller conveyor 11 having a pair of side frame members 11a, 11b with a series of rollers, such as the rollers 12 and 13, extending between the side frame members 11a, 11b in spaced parallel relation for rotation about horizontal axes. The rollers 12 and 13 are powered, as by an electric motor 14, operatively connected to a chain or other drive means 15 (FIG. 2) which engages each of the rollers in the series for rotating the same. The motor 14 is reversible for rotating the rollers 12 and 13 in opposite directions, as desired. The motor 14 is controlled from a control panel 15 located adjacent to a work station 16 in which is mounted suitable means for operating on an elongate member, such as the rotary cutting means 17.

Operation of the power conveyor motor 14 and the saw 17 are controlled by an operator located in front of the control panel 15 adjacent the work station 16. Thus, an elongate workpiece to be cut, such as the steel I-beam 20, can be conveyed forwardly in the direction of the arrow in FIG. 1 by causing the motor 14 to rotate the conveyor rollers clockwise, such as illustrated with respect to the arrow around roller 12 in FIG. 1. After a workpiece has been cut to a predetermined length by the saw 17, such as the workpiece 21, it is advanced lengthwise away from the work station 16 by similarly powering the power conveyor motor 14.

In order to enable the workpiece 20 to be cut to a predetermined length, such as the length 20a illustrated in FIG. 1, a means is provided for measuring the length of the same between an end thereof and the saw 17 and displaying the measurement to the operator on a monitor or display 22 at the control panel 15. To this end, a track 23 extends alongside the power conveyor 11 in parallel relation therewith for movably mounting a carriage 24 thereon. In the illustrated embodiment, the track 23 is provided by a wide flange I-beam arranged with its flanges 23a and 23b disposed vertically and its web 23c disposed horizontally between the flanges 23a and 23b. An elongate measuring tape 25 is secured to the outside of the outer flange 23b, and a miniature TV camera 26 is mounted on the carriage 24. The camera 26 is positioned to view the indicia on the measuring tape 25, such as through an aperture 24a in the carriage 24. The image produced by the TV camera 26 is transmitted to the monitor 22 (FIG. 1) at the control panel 15, as by a festooned cable assembly 27. The zero reference end of the tape 25 is located in the plane of the saw 17 (FIG. 1) and extends longitudinally therefrom in graduated increments such as feet, inches, and fractions of an inch, for a substantial distance, such as 20 or 30 feet, or more. A cursor is provided on the TV camera lens so that the operator can determine precisely the location of the camera, and hence the location of the beam end E relative to the tape by viewing the measurement appearing on the monitor 22 at the control panel 15.

Figure 2:
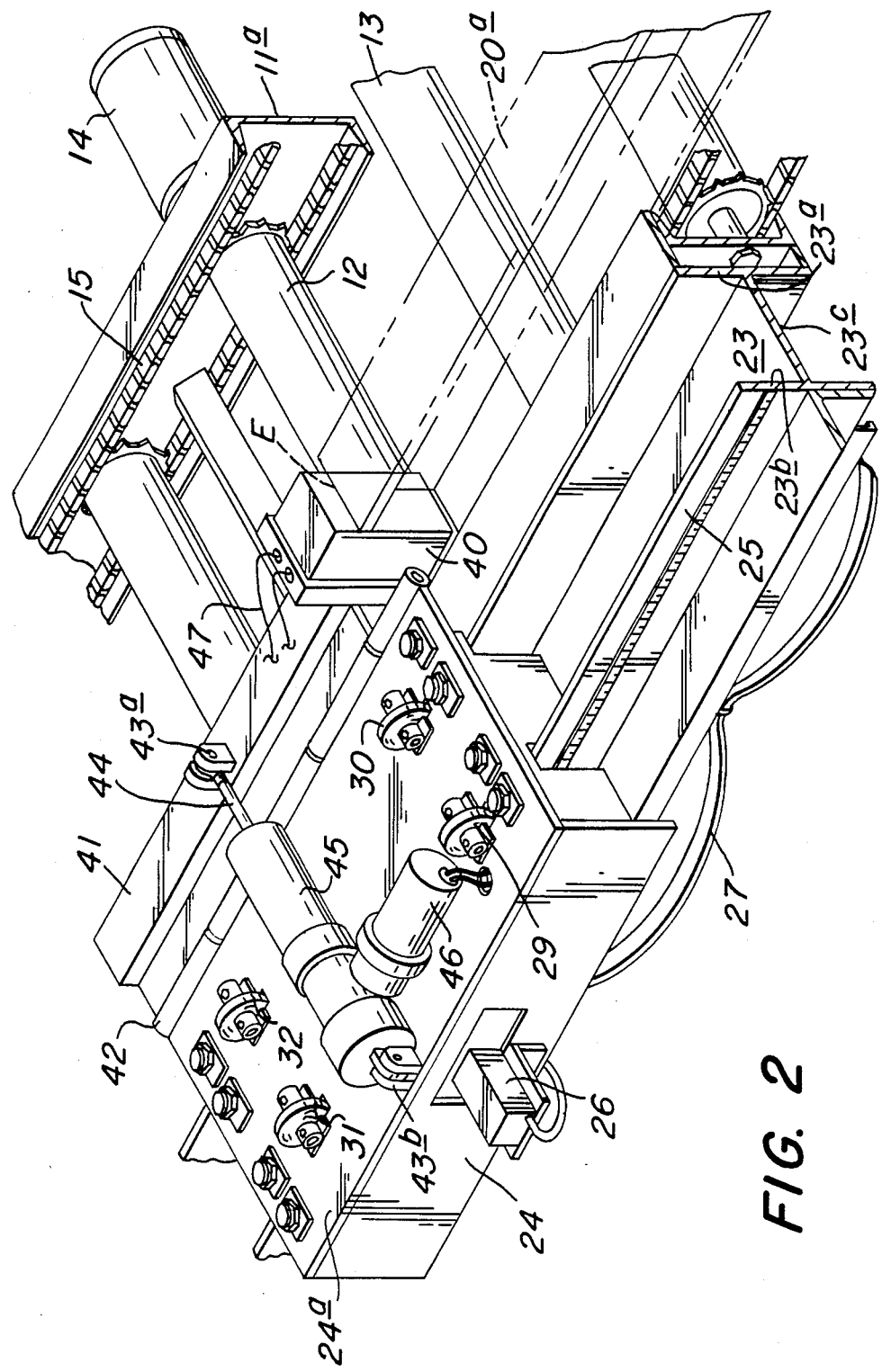
FIG. 2 is a perspective view taken on line 2—2 of FIG. 1 and illustrating the article measuring apparatus of FIG. 1 operatively engaged with the end of a beam to be cut.

According to the present invention, the carriage 24 is mounted on its guide rail 23 for free movement therealong. In other words, unlike the system disclosed in U.S. Pat. No. 3,841,462, wherein the carriage is movable under its own power with respect to a guide rail, the carriage 24 of the present invention does not have any independent propulsion means. To this end, as best seen in FIG. 2, the carriage 24 includes fore and aft pairs of wheels 29, 30 and 31, 32 mounted by pillow blocks to a horizontal carriage plate 24a which overlies the guide track 23. In the illustrated embodiment, the wheels 29-32 engage the upper edges of the flanges 23a and 23b.

Figure 4:
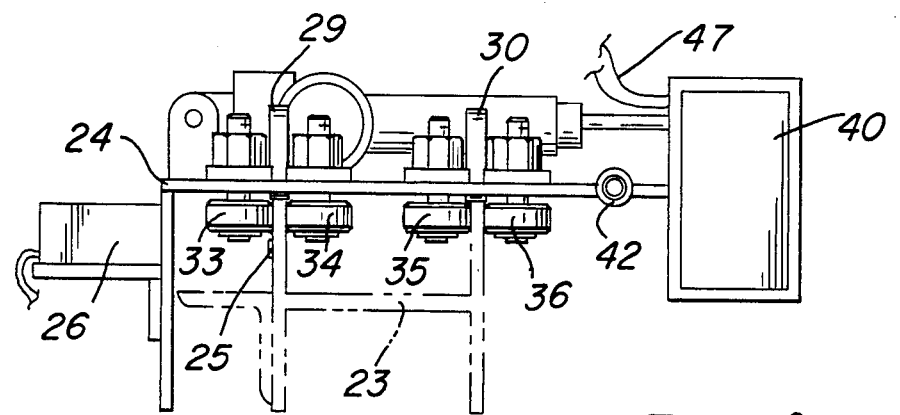
FIG. 4 is an end view of the carriage portion of the article measuring apparatus of the present invention.
Figure 5:
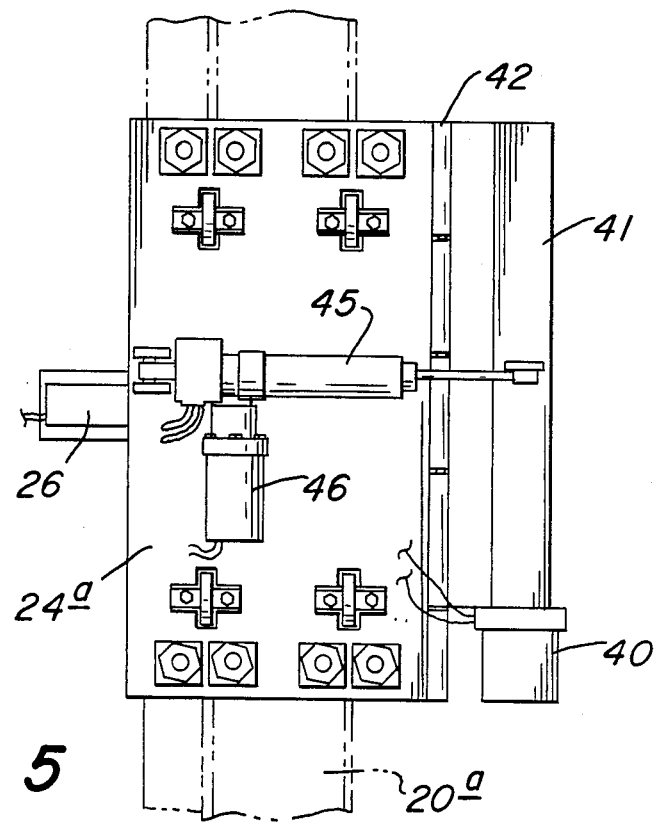
FIG. 5 is a plan view of the carriage portion of the article measuring apparatus of the present invention.

To maintain the rollers 29-32 on the top edges of the flanges 23a, 23b, a pair of auxiliary rollers are mounted below the carriage plate 24a for rotation about vertical axes adjacent to each edge roller. For example, as best seen in FIG. 4, a roller 33 is bolted to the carriage plate 24 to engage the outside of the beam flange 23b, and its companion roller 34 is mounted to the carriage plate 24a to engage the inside of the same beam flange 23b. The rollers 35 and 36 are similarly mounted with respect to the parallel beam flange 23a. Preferably, all the rollers have internal ball or roller bearings to afford a low friction rolling action. Thus, the carriage 24 is mounted for free movement relative to its guide beam 23 by the cooperation of the fore and aft pairs of rollers 29-36.

According to the present invention, the carriage 24 is displaced relative to the measuring tape 25 solely by means of the movement of the workpiece on the power conveyor 11. To this end, a means which is remotely operable from the control panel 15 is provided on the carriage 24 for releasably clamping the carriage 24 to the workpiece at a predetermined location. Preferably, the clamping means includes an electromagnet 40 which is adapted to engage the forward end E of the workpiece 20a to be cut and to magnetically clamp thereto when positioned in the path of movement of the workpiece 20a such as in the manner illustrated in FIG. 2.

Figure 3:
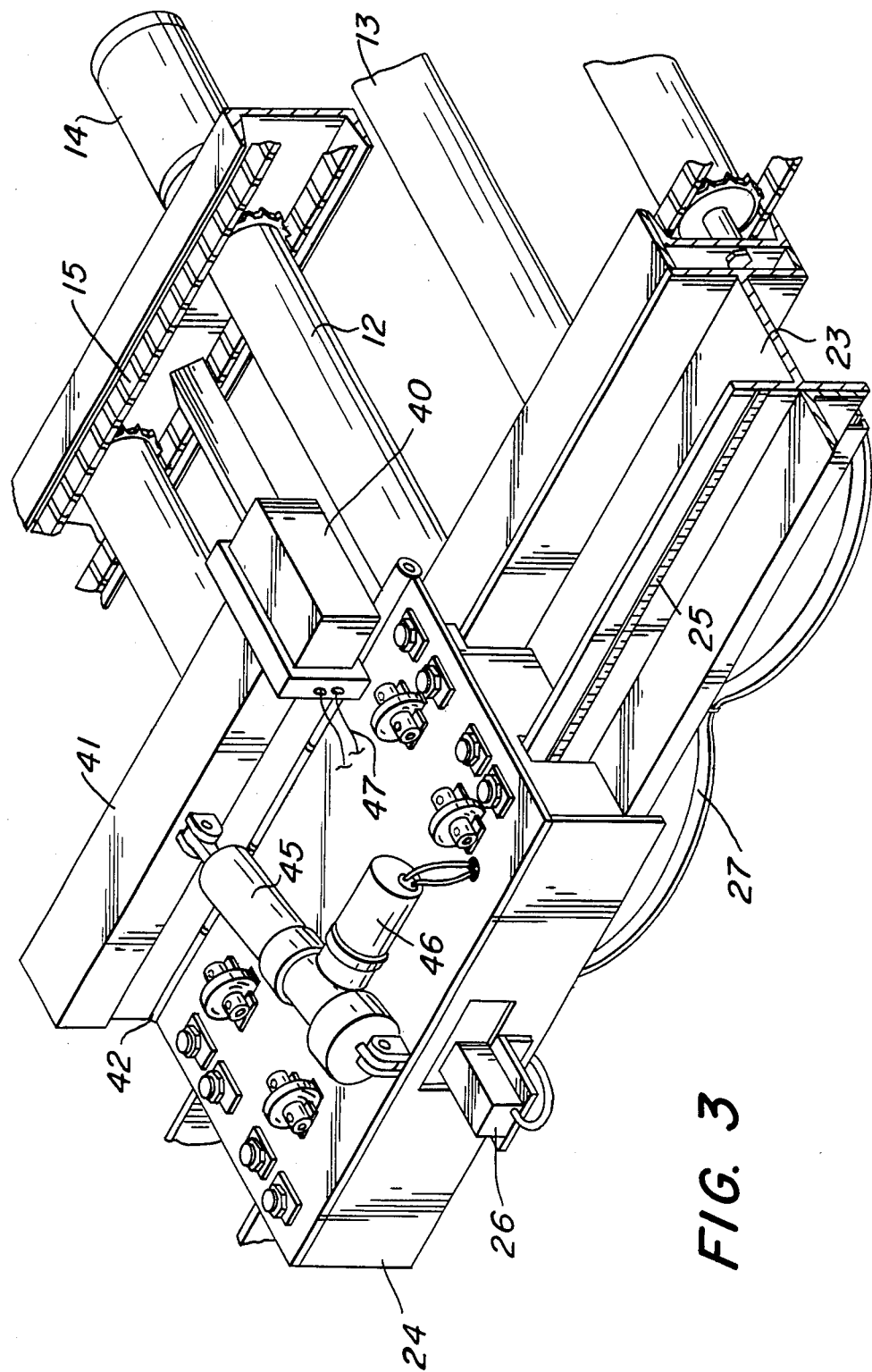
FIG. 3 is a view similar to FIG. 2 but illustrating the article measuring apparatus operatively disengaged from the end of the beam.

To enable the workpiece to pass beyond the electromagnet 40 after cutting, the electromagnet 40 is movable from the position illustrated in FIG. 2 wherein it overlies the conveyor rollers and is engaged with the end E of the workpiece 20a into a position such as illustrated in FIG. 3, wherein it is located upwardly and laterally with respect to the conveyor rollers. To this end, the electromagnet 40 is mounted on the end of a bar 41 which extends along the inner edge of the carriage plate 24a and is pivotally secured thereto by means of a hinge 42. The bar 41 has a clevis 43a which pivotally receives an operating rod 44 connected to an actuator 45. The actuator 45 is powered by an electric motor 46 and is mounted to the carriage plate 24a by its own clevis 43b. Power is supplied to the actuator motor 46 via the cable assembly 27 festooned along the underside of the carriage guide beam 23. The actuator assembly, 45, 46 includes internal limit switching means operable to control the operation of the actuator motor 46 so that the electromagnet 40 is disposed either in the position illustrated in FIG. 2 for engaging the end E of the workpiece 20a or in the position illustrated in FIG. 3 lifted upwardly and laterally with respect to the workpiece 20a for allowing the workpiece 20a to advance past the carriage 24 on the power conveyor 11.

The electromagnet 40 is supplied with current by wires 47 which are connected to a suitable power source via the cable assembly 27 festooned beneath the guide beam 23. A suitable electrical control switch is provided at the control panel 15 for energizing and de-energizing the electromagnet remotely. Preferably, the electromagnet 40 is capable of exerting a force of about 600 pounds.

In use, the carriage 24 with the electromagnet 40 located in its down position overlying the conveyor, as illustrated in FIG. 2, is positioned downstream of the saw 17. With the electromagnet energized, an operator at the control panel 15 activates the power conveyor motor 14 and causes the power conveyor rollers 12, 13, and the like, to rotate and thereby to advance the workpiece 20 in the direction indicated by the arrow in FIG. 1. Movement of the workpiece 20 continues until such time as its leading end E engages the energized electromagnet 40. At such time, the electromagnet 40 clamps itself, and hence the carriage 24, to the end E of the workpiece 20. When so clamped, the carriage 24 moves in unison with the workpiece 20 and, therefore, the camera 26 moves with the carriage 24 relative to the measuring tape 25. This enables the operator to position the workpiece 20 with respect to the saw 17 simply by actuating a control at the control panel 15 for rotating the conveyor drive motor 14 in one direction or the other and thereby advancing the workpiece 20 either forwardly or rearwardly with respect to the cutter 17.

If at startup, the carriage 24 is located a considerable distance downstream of the work station 16 a greater distance than the length of a workpiece to be cut, an operator could simply displace the workpiece 20 on the power conveyor 11 until the end of the workpiece E engages the electromagnet 40 and is clamped thereto. The operator could then reverse the rotation of the power conveyor motor 14 to displace the workpiece rearwardly relative to the cutter 17, until the cross-hairs on the TV camera 26, as displayed on the monitor 22, are aligned with the proper indicia on the measuring tape 25 indicating the distance the workpiece end E is from the cutter 17. Then, the cutter 17 is energized, and a length 20a cut from the workpiece 20.

After the length 20a of a workpiece has been cut, the electromagnetic 40 is de-energized, thereby releasing the same from the end E of the cut workpiece 20a. The magnet actuator motor 46 is thereupon energized and the electromagnet 40 lifted upwardly and laterally with respect to the cut workpiece 20a, such as into the position illustrated in FIG. 3. Then, the operator again energizes the power conveyor motor 14 for driving the rollers and displacing the cut length 20a forwardly, such as into the position indicated at 21 in FIG. 1.

The aforementioned measuring and cutting action occurs without the carriage 24 having to be clamped to its guide rail 23 and without its having to be independently powered. By clamping the carriage 24 to the end of a workpiece, the carriage 24 is moved by the same means which displaces the workpiece, i.e. the power conveyor. Moreover, since the carriage 24 does not have to be clamped to its guide rail 23 at a predetermined location with respect to the cutter 17, an operator needs to be less concerned about knocking the carriage loose from its locked position. Accordingly, the apparatus of the present invention is easy to operate. Furthermore, the apparatus of the present invention is considerably less expensive to construct and maintain than prior art devices because there is no need for the carriage 24 to be self-powered or for it to have a locking means for clamping itself to its guide rail. Thus, it should be apparent that the present invention now provides improved apparatus for measuring ferromagnetic elongate workpieces, such as steel I-beams, channels, and the like, to enable them to be cut to a predetermined length.

While a preferred embodiment of the present invention has been described in detail, various modifications, alterations and changes may be made without departing from the spirit and scope of the present invention as defined in the appended claims.

I claim:

1. In apparatus for measuring a length of an elongate member from one end thereof and performing an operation on the member at a datum location remote from said end, said apparatus including a conveyor adapted to receive the elongate member and to permit it to be advanced lengthwise in opposite directions with respect to said datum location, an elongate measuring scale extending lengthwise of said conveyor, a carriage mounted for movement parallel to said conveyor and along said scale, means mounted on said carriage for reading said scale and remotely displaying the reading, and means for driving said conveyor selectively in opposite directions for displacing said elongate member lengthwise relative to said datum location, the improvement comprising: remotely operable means mounted on said carriage for releasably coupling said carriage to said end of said elongate member for causing said carriage to move in unison with said elongate member when said elongate member is displaced in either of said opposite directions, whereby a measured length of said elongate member can be precisely positioned with respect to the datum location.

2. Apparatus according to claim 1 wherein said remotely operable means includes an electromagnet and means on said carriage for moving said electromagnet laterally of said elongate member into and out of operative engagement therewith.

3. Apparatus according to claim 2 wherein said electromagnet moving means includes an actuator arm pivotally mounted on said carriage for movably mounting said electromagnet into and out of the path of movement of the structural member on the conveyor.

4. In apparatus for measuring a length of an elongate member from one end thereof and performing an operation on the member at a work station remote from said end, said apparatus including a conveyor adapted to receive the elongate member and to permit it to be advanced lengthwise selectively in opposite directions with respect to said work station, an elongate measuring scale extending lengthwise alongside said conveyor, a carriage mounted for movement parallel to said conveyor and alongside said scale, means mounted on said carriage for reading said scale and displaying the reading at said work station, and reversible means for selectively driving said conveyor in opposite directions and thereby displacing said elongate member lengthwise in opposite directions relative to said work station, the improvement comprising: means mounted on said carriage and operable from said work station for releasably clamping said carriage to said end of said elongate member for causing said carriage to move in unison with said elongate member when said elongate member is displaced in either of said opposite directions, whereby a measured length of said elongate member can be precisely positioned with respect to the work station and operations thereat performed thereon by driving the conveyor in selected directions with the carriage coupled to the end of the elongate member.

5. Apparatus according to claim 4 wherein said elongate member is of ferromagnetic material and said releasable clamping means includes an electromagnet.

6. Apparatus according to claim 5 including actuator means on said carriage mounting said electromagnet for movement selectively into and out of the path of movement of the elongate member for enabling the electromagnet to releasably engage the end of the elongate member.

7. In apparatus for measuring a structural steel member and cutting the member to a predetermined length, said apparatus including a roller conveyor adapted to receive the structural member and to permit it to be advanced lengthwise in opposite directions with respect to a cutting work station, an elongate measuring scale extending lengthwise alongside said conveyor, a carriage mounted for movement parallel to said conveyor and alongside said measuring scale, means mounted on said carriage for reading said scale and remotely displaying the reading at the cutting work station, and reversible means for driving said roller conveyor in selected opposite directions for displacing said structural member lengthwise relative to said cutting work station, the improvement comprising: magnetic means mounted on said carriage and operable from said cutting work station for releasably clamping said carriage to said structural member for causing said carriage to move in unison with said structural member when said structural member is displaced in either of said opposite directions, actuator means mounting said magnetic means to said carriage for displacing said magnetic means into and out of the path of movement of the structural member on said conveyor, said actuator means operable initially to place the magnetic means in the path of movement of the structural member as it advances lengthwise on the conveyor away from the cutting work station for engaging the end of the structural member and clamping magnetically thereto, said actuator means also operable to move said magnetic means out of the path of movement of the structural member to permit the previously clamped end of the structural member to advance on the conveyor past the carriage, whereby a measured length of said structural member can be displaced lengthwise in opposite directions on the conveyor and precisely positioned and cut at the cutting work station and, after cutting, advanced lengthwise on the conveyor away from the cutting work station.

* * * * *